Figure 1:
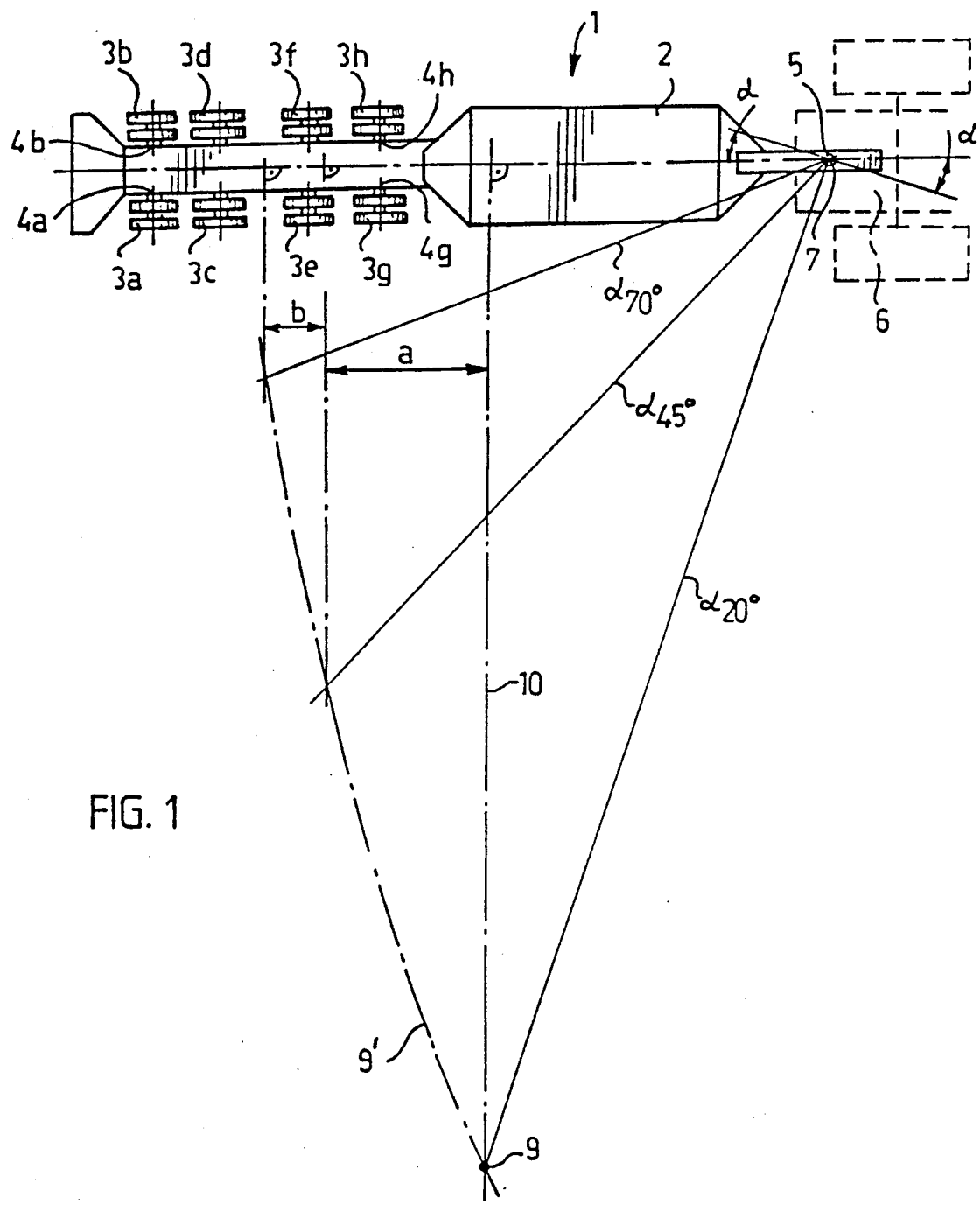

United States Patent [19]

Vänninmaja et al.

[11] Patent Number: 5,013,057
[45] Date of Patent: May 7, 1991

[54] METHOD OF CONTROLLING A TRANSPORT MEANS AND A TRANSPORT MEANS FOR EFFECTING THE METHOD

[75] Inventors: Pekka Vänninmaja, Tervakoski; Rainer Jakobsson, Hämeenlinna, both of Finland

[73] Assignee: Teco Systems Oy, Tervakoski, Finland

[21] Appl. No.: 356,342

[22] Filed: May 23, 1989

[51] Int. Cl.⁵ .............................................. B62D 53/06
[52] U.S. Cl. .................................. 280/426; 280/442; 180/132
[58] Field of Search ...................... 280/426, 442, 100; 180/79.4, 144, 140, 132

[56] References Cited

U.S. PATENT DOCUMENTS

| | | | |
|---|---|---|---|
| 3,733,084 | 5/1973 | Mauck | 280/81.5 |
| 3,734,538 | 5/1973 | Humes | 280/426 |
| 4,412,594 | 11/1983 | Furukawa | 180/140 |
| 4,494,766 | 1/1985 | McHugh et al. | 280/444 |

FOREIGN PATENT DOCUMENTS

| | | | |
|---|---|---|---|
| 0282426 | 9/1988 | European Pat. Off. | 280/426 |
| 824302 | 12/1951 | Fed. Rep. of Germany | |
| 2040443 | 2/1972 | Fed. Rep. of Germany | |
| 2200739 | 7/1973 | Fed. Rep. of Germany | |
| 2911098 | 9/1980 | Fed. Rep. of Germany | |
| 0289472 | 12/1987 | Japan | 280/442 |
| 0912581 | 3/1982 | U.S.S.R. | 280/426 |

Primary Examiner—Richard A. Bertsch
Assistant Examiner—Mitchell Bompey
Attorney, Agent, or Firm—Ladas & Parry

[57] ABSTRACT

A transport means (1) comprising a body (2) and several wheels (3a to 3h) positioned in the longitudinal direction one after another on both sides of the body and turnable about vertical axes (4a to 4h). The transport means (1) is supported at one end turnably by means of a tractor means (6) by means of which the direction of travel of the transport means (1) is controlled. In order that the transport means could be controlled more easily, a control sensor (7) is mounted in a swing joint (5) connecting the transport means (1) to the tractor means (6), which control sensor indicates the angle ($\alpha$) of turning between the tractor means (6) and the transport means (1), whereby the sensor (7) together with an adjusting means (8) controls the turning of the wheels (3a to 3h) in proportion to the angle ($\alpha$) of turning. When the angle ($\alpha$) of turning is, e.g., no more than 20°, the adjusting means (8) controls the wheels (3a to 3h) so that they turn in such a way that the transport means (1) turns about a center (9) of turning positioned in the middle thereof in the longitudinal direction, whereby the turning radii at the front and rear end are substantially equal. When the angle ($\alpha$) of turning exceeds 20°, the position of the center (9) of turning is shifted in the longitudinal direction of the transport means (1) in proportion to the value of the angle ($\alpha$) of turning towards the rear end of the transport means (1), whereby in parking situations it behaves similarly as a conventional trailer, but the axes of all the wheels (3a to 3h) go through the center (9) of turning, whereby the wheels always rotate without sliding.

8 Claims, 3 Drawing Sheets

METHOD OF CONTROLLING A TRANSPORT MEANS AND A TRANSPORT MEANS FOR EFFECTING THE METHOD

This invention relates to a method of controlling a transport means comprising a body and wheels attached to the body on both sides of the central line thereof one after another in the longitudinal direction of the body, whereby for changing the direction of travel of the transport means at least some of the wheels are turned about vertical axes of turning through an angle with respect to the longitudinal direction of the body in such a way that rotation axes for all the wheels intersect substantially at the same vertical axis of turning, whereby the transport means turns about the axis of turning while it moves. The invention is also concerned with a transport means intended for effecting the method and comprising a body and wheels attached to the body on both sides of the central line thereof one after another in the longitudinal direction of the body, the wheels being turnable about vertical axes of turning for changing the direction of travel of the transport means, power means for turning the wheels; and control means comprising an adjusting means for controlling the power means in such a way that when the direction of travel is changed the rotation axes of the wheels intersect substantially at the same vertical axis of turning.

Heavy objects, such a machines, containers, and the like, are usually transported by means of transport carriages or vehicles comprising several shafts. In transport carriages, the shafts and the wheels attached thereto are positioned at one end of the carriage and the moving of the carriage is controlled by a tractor means supporting the other end thereof and being turnable with respect to the carriage. When the shafts are fixed in the same direction with respect to the carriage, some of the wheels are forced to slide along the surface of the ground in connection with turning, which makes the turning more difficult, wears down the tires and strains the apparatus. In addition, the rear end of such carriages rights itself at turns and requires from the tractor means an extra safety distance from obstacles.

Also, a transport means is known in which a number of wheels turnable independently about a vertical axis are provided under a carriage functioning as a vehicle, whereby when the direction of the carriage is changed, wheels at the front and rear end thereof are turned in opposite directions so that all the wheels move along the circumferences of circles drawn about the same centre, so that the wheels do not drag along the ground. One problem with such a solution is the control of the device in connection with parking, because it requires an equally large space at both ends for turning, and an equally large movement at both ends requires extremely accurate control in order to get the device precisely in place.

The object of the present invention is to provide a method of controlling a transport means in such a way that the transport means is both easy to control during displacement transport and easy to park as desired, and the invention is characterized in that all the wheels of the transport means are turned about the vertical axes and that when the angle of turning of the transport means is at least more than a predetermined angle, the wheels are turned with respect to each other in such a way that the position of the axis of turning in the longitudinal direction of the transport means shifts in proportion to the magnitude of the angle of turning.

The basic idea of the invention is that during the transport stage when the angles of turning are relatively small, the wheels of the transport means move along circumferences drawn about a centre of turning positioned on the side of the middle point of the transport means, and normal safety distances suffice for the steering thereof, and that at the parking stage the centre of turning of the transport means is shifted towards the rear end when the turning angle increases, whereby the front and the rear end turn along unequal arcs and the parking is easy to carry out.

Figure 2:
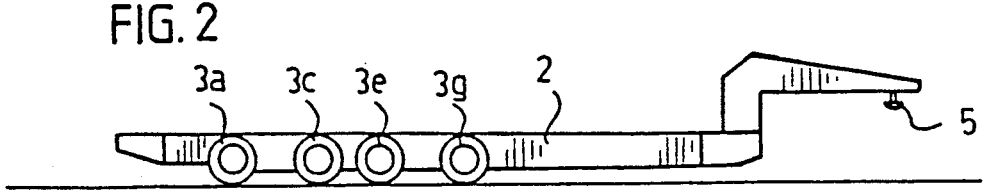
Figure 4:
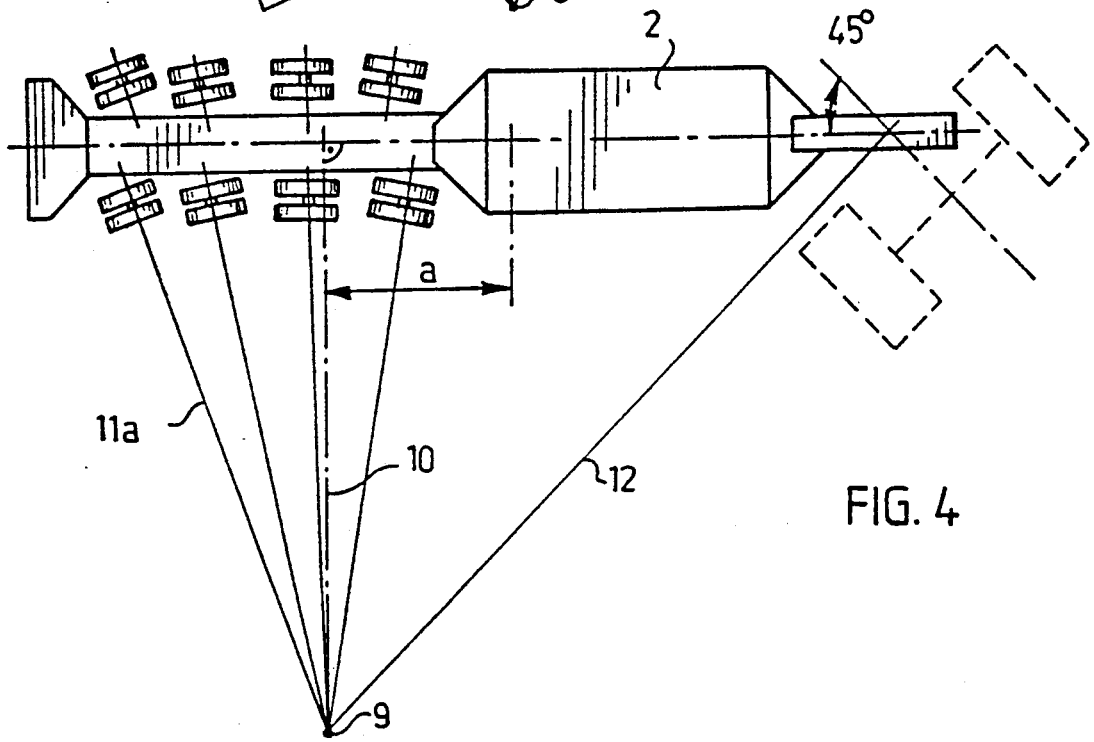
Figure 5:
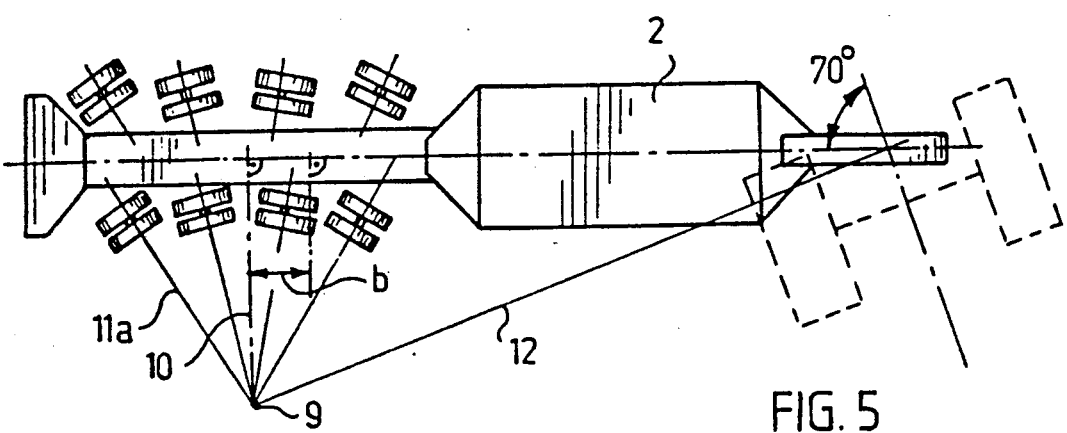
Figure 6:
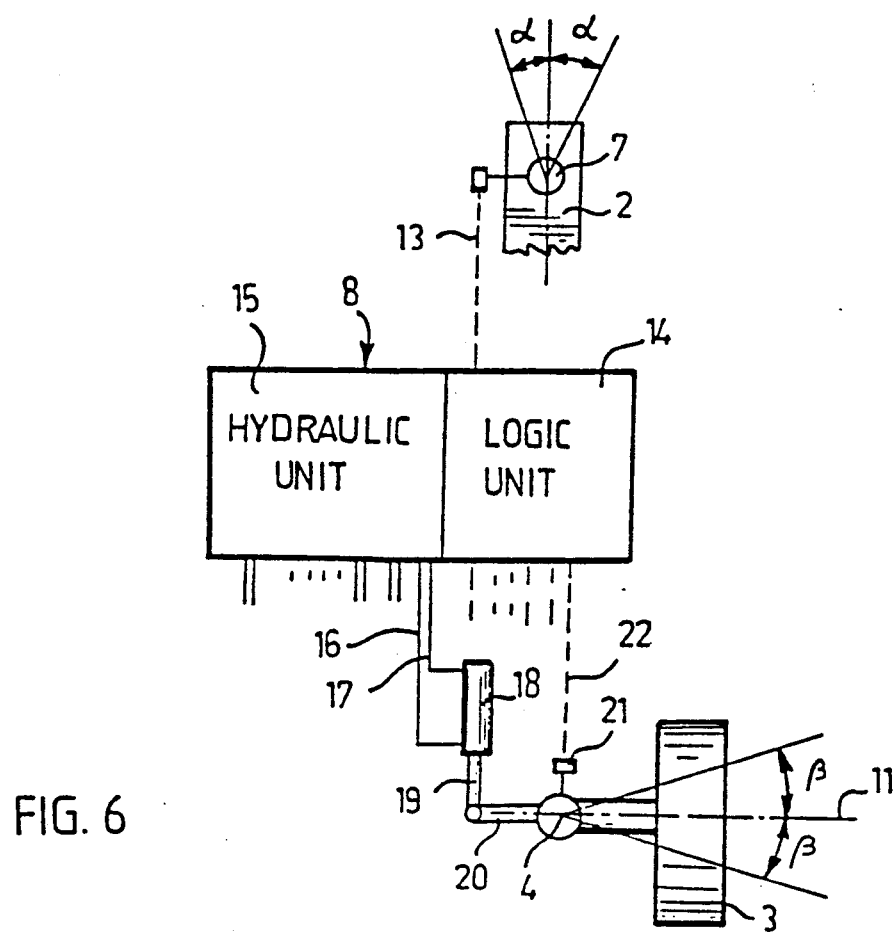

The invention will be described in more detail in the attached drawings, wherein FIG. 1 is a schematical top view of a transport means according to the invention, FIG. 2 is a side view of the transport means of FIG. 1, FIGS. 3 to 5 are top views of the embodiment of FIG. 1 when driving with different angles of turning, and FIG. 6 is a schematical view of one arrangement for controlling the transport means.

FIG. 1 is a top view and FIG. 2 a side view of a transport means 1 comprising a body 2, paired wheels 3a to 3h positioned at the rear end of the body and being turnable about vertical axes 4a to 4h thereof. At the front end of the body 2 there is provided a swing joint 5 by means of which the transport means 1 can be connected turnably to a separate tractor means 6. The swing joint 5 is provided with a control sensor 7 which indicates the angle between the longitudinal axis of the tractor means 6 and that of the transport means 1, that is, an angle $\alpha$ of turning.

The angle of turning indicates how much the direction of travel of the transport means changes over a predetermined distance, i.e., the magnitude of the angle defined between the original longitudinal direction of the transport means and the longitudinal direction of the transport means after the intersection of the central line and a line segment drawn through the centre of turning of the transport means perpendicularly to the longitudinal central line of the transport means has moved a predetermined distance. As referred to in both the specification and the claims of the present application, the definition angle of turning has the above meaning.

Figure 3:
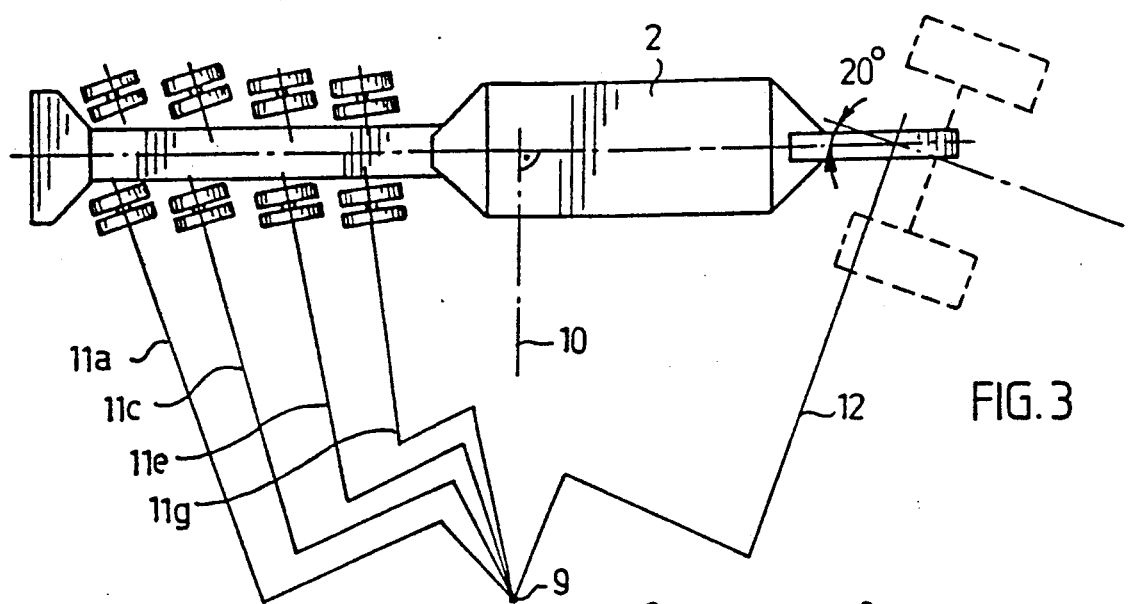

When the direction of travel of the transport means 1 is changed, the tractor means 6 turns, whereby the control sensor 7 indicates the angle $\alpha$ of turning. By means of an adjusting means 8, the structure and operation of which are described in more detail in connection with FIG. 5, the wheels 3a to 3h are turned in different ways according to the magnitude of the angle $\alpha$ of turning. When the angle $\alpha$ of turning is small, e.g., no more than 20°, the transport means 1 is controlled, as shown in FIG. 3, so that it turns about the centre 9 of turning positioned at its longitudinal midpoint, whereby both ends of the transport means 1 move along substantially the same circular arc and the control of the transport means 1 is easy in e.g. displacement drive. In this situation, a line drawn through the centre 9 of turning perpendicularly to the central line of the transport means 1, i.e., a division line 10, goes through the longitudinal midpoint of the transport means 1. The wheels 3a to 3h are turned about the vertical axes 4a to 4h thereof so that the rotation axis 11a to 11h of each wheel goes through the centre 9 of turning similarly as a line 12 perpendicular to the longitudinal axis of the tractor means 6 goes through the swing joint 5.

The angle $\alpha$ of turning usually exceeds 20° in parking situations, whereby it is necessary that the radius of turning of the transport means 1 is short and on the other hand it should be easy to control. Therefore the position of the centre 9 of turning in the longitudinal direction of the transport means 1 is shifted when the angle $\alpha$ of turning increases, in order that the controllability of the transport means 1 would be as desired.

With regard to the described transport means 1 to be transferred by means of the tractor means 6, it is preferable to shift the centre 9 of turning towards the rear end of the transport means 1 as shown in FIGS. 4 and 5, whereby the distance of the centre 9 of turning from the rear end of the transport means 1 is the shorter the larger the angle $\alpha$ of turning is. In FIG. 4, the angle $\alpha$ of turning is 45°, whereby the centre 9 of turning has been shifted over a distance a towards the rear end of the transport means 1. At the same time the radii of turning of the rear and front ends of the transport means 1 have decreased, though the radii of turning of the rear end in a considerably greater degree. In FIG. 3, all the wheels 3a to 3h were turned in the same direction with respect to the body 2 of the transport means 1, even though through different angles, whereas in FIG. 4 the wheels 3g and 3h are already positioned in different direction with respect to the body 2 and the wheels 3e and 3f turned nearly in parallel with the body, whereby the axes 11a to 11h of all the wheels 3a to 3h still intersect at the centre 9 of turning.

In FIG. 5, the angle $\alpha$ of turning is 70°, whereby the centre 9 of turning has shifted over a distance b farther backwards and is positioned substantially midway between the wheels 3a to 3h. The radii of turning of the front and rear end of the transport means 1 are still shorter than in FIG. 4, whereas the radii of turning at the rear end have again shortened to a greater extent. FIG. 1 illustrates on one hand the shifting of the centre 9 of turning in the longitudinal direction of the transport means 1 and on the other hand the changing of the radii of turning according to the angle $\alpha$ of turning, whereby the centre of turning moves along an arc 9'. FIG. 1 also illustrates the shifting of the division line 10 with the centre 9 of turning. It appears from FIGS. 4 and 5 how the wheels positioned on opposite sides of the division line are turned in opposite directions with respect to each other in order that the axes of the wheels 3a to 3h would intersect at the centre 9 of turning. By "opposite directions" of the turning of the wheels is meant that the wheels on one side of the division line rotate in one direction about their vertical axes while the wheels on the other side of the division line rotate in the opposite direction about their vertical axes. Thus, as shown in FIG. 4, for example, the wheels to the left of the division line 10 are rotated counter-clock wise from their straight-ahead position (FIG. 1), whereas the wheels to the right of the line 10 are rotated clockwise. Thus, the wheels turn in "opposite directions".

FIG. 6 shows one arrangement for the control of the wheels 3a to 3h of the transport means 1. For the sake of clarity, only components associated with the turning of the wheel 3a are shown in the figure, the connections and operation of the other wheels 3b to 3h being similar to those described. The control sensor 7 indicating the angle $\alpha$ of turning is connected via a control line 13 to the adjusting means 8, which comprises a logic unit 14 and a hydraulic unit 15 controlled by the logic unit 14. The hydraulic unit 15 is connected by means of hydraulic fluid conduits 16a and 17a to a cylinder 18a a piston rod 19a of which is by means of a lever 20a connected so as to turn the wheel 3a about its axis of turning 4a. The axis of turning 4a comprises an angle gauge 21a which indicates the angle $\beta$ of turning of the rotation axis 11a of the wheel 3a into the normal position of the axis 11a, that is, to a position perpendicular to the longitudinal direction of the body 2. The angle gauge 21a is by means of a feedback line 22a connected to the logic unit 14 for indicating therein the position of the wheel 3a.

The arrangement operates in such a manner that when the tractor means 6 turns with respect to the transport means, the control sensor 7 indicates the angle $\alpha$ of turning, which information is applied through the control line 13 to the logic unit 14. On the basis of the obtained angle value, the computer of the logic unit 14 calculates for each wheel 3a to 3h the required turning angle $\beta$ a to $\beta$ h, at which the rotation axes 11a to 11h of all the wheels 3a to 3h intersect at the centre of turning and which connects the hydraulic unit 15 to feed hydraulic fluid into the hydraulic conduits 16 or 17 of each wheel 3a to 3h for turning the wheels 3a to 3h by means of the cylinders 18 to the calculated angles $\beta$ a to $\beta$ h. The angle gauges 4 indicate the turning angle $\beta$ a to $\beta$ h of each wheel 3a to 3h, and when connection lines 22 indicate that each wheel 3a to 3h has turned through the calculated angle, the logic unit 14 stops the turning of the wheel in question. When the angle of turning changes, the above-described operation is repeated and, in practice, the process takes place continuously.

The invention is not restricted to the above-described embodiments only, but it can be effected in various ways. The wheels of the transport means may be single or paired wheels and there may be several such wheels provided on the same shaft turnably about a single axis of turning. It is not necessary that the wheels should move along the same path when driving straight ahead, but successive wheels can be positioned in different ways in the transverse direction of the transport means. Even though the drawings show a solution in which several successive wheels are positioned on the same side at one end of the transport carriage, the invention can as well be applied in a solution in which there are only two wheels in succession. Besides a transport carriage to be drawn with a tractor means, the transport means may be an independent vehicle the direction of travel of which is controlled e.g. by means of a steering wheel or the like. Thereby the control system controls the turning of each wheel in such a manner as described above. In such a case, it is possible to connect the control sensor to indicate the angle of the steering wheel or a separate wheel to be controlled by means of a steering wheel. The wheels can be turned by means of any suitable power means and constructions in place of hydraulic components. The sensors indicating the angle of turning of the wheels can be left out, if the control means and the turning means are otherwise sufficiently accurate.

We claim:

1. A transport means (1), comprising a body (2) and wheels (3a to 3h) attached to the body on both sides of a central line thereof one after another in a longitudinal direction of the body, all of the wheels being turnable about vertical axes (4a to 4h) of turning for changing the direction of travel of the transport means (1), power means (18) for turning the wheels (3a to 3h), and control means (7, 8, 13-22) comprising an adjusting means (8) for controlling the power means (18) in such a way that when the direction of travel is changed the rotation axes (11a to 11h) of all the wheels (3a to 3h) intersect substantially at a same vertical axis (9) of turning, characterized in that the control means (7, 8, 13-22) comprise a control sensor (7) controlling the adjusting means (8), which sensor indicates an angle ($\alpha$) of turning of the transport means (1), and that the adjusting means (8) is connected to control the power means (18) in such a way that at least when the angle ($\alpha$) of turning exceeds a predetermined angle, the position of said same axis (9) of turning is shifted in the longitudinal direction of the transport means (1) in proportion to the angle ($\alpha$) of turning.

2. A transport means (1) according to claim 1, characterized in that an angle gauge (21) for each axis (4a to 4h) of turning of the wheels (3a to 3h) is connected in the adjusting means (8), which gauge indicates the angle ($\beta$) turning of the wheel (3a to 3h) with resect to the body (2).

3. A transport means (1) according to claim 1 characterized in that the adjusting means (8) is connected to control the turning of the wheels (3a to 3h) in such a way that the wheels (3a to 3h) on opposite sides of a division line (10) going through the axis (9) of turning perpendicularly to the longitudinal direction of the body (2) are turned in opposite directions with respect to each other, and that the division line (10) is positioned substantially in the middle of the transport means (1) when the angle ($\alpha$) of turning is no more than the predetermined angle, and that the division line (10) is shifted in proportion to the angle ($\alpha$) of turning towards one end of the transport means (1) when the angle ($\alpha$) of turning exceeds the predetermined angle.

4. A transport means according to claim 3 further characterized in that the division line (10) is shifted in proportion to the angle ($\alpha$) of turning towards the rear end of the transport means (1) when the angle ($\alpha$) of turning exceeds the predetermined angle.

5. A transport means (1) according to claim 1, characterized in that it is arranged to be connected turnably at one end thereof to a separate tractor means (6) and that the control sensor (7) is mounted to indicate an angle ($\alpha$) of turning between the tractor means (6) and the transport means (1).

6. A method of controlling turning of a transport means (1) a front end of which is attached to and pulled by a tractor, said transport means comprising a body (2) having a longitudinal axis and a plurality of wheels attached to the body on each side thereof one after another in the longitudinal direction of the body, the method comprising the steps of turning all of said wheels about vertical axes of turning through an angle with respect to the longitudinal direction during the turning of the transport means so that rotation axes all of the wheels always intersect substantially at a same vertical axis of turning, and, when the angle of turning of the transport means is greater than a predetermined angle, turning all of the wheels with respect to one another so that a position of said same vertical axis of turning shifts in the longitudinal direction of the body in proportion to the magnitude of the angle of turning of the transport means with the result that a turning radius of the front end of said body is greater than that of a rear end thereof in proportion to the magnitude of the angle of turning of the transport means.

7. A method according to claim 6 comprising turning all of the wheels through angles opposite to each other on opposite sides of a division line perpendicular to the longitudinal direction of the body and passing through said same vertical axis of turning, whereby the division line is positioned substantially midway of the longitudinal length of the body when the angle of turning of the transport means is no more than the predetermined angle, and turning the wheels when the angle of turning of the transport means is greater than the predetermined angle of shifting the division line longitudinally of the transport means in proportion to the angle of turning of the transport means.

8. A method according to claim 7 comprising turning all of the wheels when the angle of turning of the transport means is greater than the predetermined angle for shifting the division line longitudinally to the rear of the transport means in proportion to the angle of turning of the transport means.

* * * * *